United States Patent Office 3,404,143
Patented Oct. 1, 1968

3,404,143
IODINATED X-RAY CONTRAST AGENTS
Jaromír Hebký and Václav Jelínek, Prague, and Miroslav Karásek, Modřany, Czechoslovakia, assignors to SOFA, Spojené podniky pro zdravotnickou výrobu, Prague, Czechoslovakia
No Drawing. Filed Dec. 17, 1965, Ser. No. 514,694
Claims priority, application Czechoslovakia, Dec. 21, 1964, 7,232/64, 7,233/64
7 Claims. (Cl. 260—211)

The invention relates to new iodinated X-ray contrast agents and to a method of preparing same; said substances have the general Formula I:

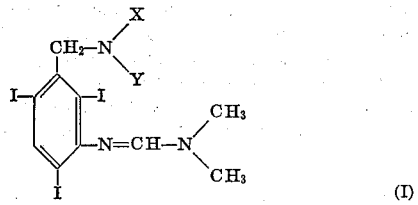

wherein X and Y are the same or different and are members selected from the group consisting of (a) hydrogen, (b) straight or branched alkyl, the same alkyl having up to 7 carbon atoms and including from 0 up to 6 hydroxyl groups, (c) an alkyl ring portion adapted to form a ring with the nitrogen attached to the methylene of the benzyl group, the said ring containing up to 6 carbon atoms and (d) alkoxy adapted to form an oxygen containing ring with the nitrogen attached to the methylene of the benzyl group, the said ring containing up to 6 members.

The substances of the above cited general formula constitute a new type of X-ray contrast agents, which after oral application secrete into the gall, thus creating a positive contrast filling of the gall bladder and permitting its X-ray examination. The substances can be applied in the form of base for instance in the form of salts of acids that are well tolerated by the organism. Said salts are stable in aqueous solutions. It was found that the dimethylaminomethyleneamino group in the position 3 favourably influences the resorption in the digestive tract. The toxicity of the new substances is low, and the toleration thereof very good.

According to the invention, the substances of the general Formula I are prepared by reacting a benzyl halide of the general Formula II:

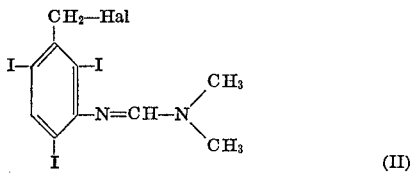

wherein Hal signifies a halogen atom, especially chlorine or bromine,
with an amino compound of the general Formula III

wherein X and Y have the same meaning as in the Formula I.

The reaction can be carried out in the medium of an inert organic solvent, such as an alkanol with 2–5 carbon atoms, preferably ethanol, at an elevated temperature, preferably at the temperature of the reaction mixture boiling point, in the presence of an organic or inorganic basically reacting compound, capable of binding the hydrogen halide formed. As the amino-compounds of the general Formula III, compounds such as diethyl amine, β-ethanol amine, γ-propanol amine, diethanol amine, trimethylolmethyl amine, 2-methyl-2-amino-1.3-propanediol, piperidine, cyclohexyl amine, benzyl amine, morpholine, piperazine, N-methylpiperazine, N-methylglucamine, 1-amino-1-deoxy-D-arabitol, etc., can be used.

The new substances of the general Formula I are practically colourless, crystallize for the most part remarkably well, and are stable.

The compounds of the general Formula II, constituting the starting material for the method according to the invention, can be prepared, for example, by treating 2,4,6 - triiodo-3-dimethylaminomethyleneaminobenzyl alcohol with halogenation agents, such as phosphorus halides, thionyl chloride or thionyl bromide, or by converting by known methods the amino group of the corresponding 2,4,6-triiodo-3-aminobenzyl halide to a dimethylaminomethyleneamino group, e.g. by the action of the agent formed by reacting dimethyl formamide with phosphoryl trichloride, phosgene, or thionyl chloride.

The following examples have only the purpose to illustrate the method of the invention, without intending any limitation of the scope thereof.

Example 1

31.1 g. (0.06 mole) of 2,4,6-triiodo-3-aminobenzyl chloride are suspended in 75 ml. anhydrous dimethyl formamide, and under moderate external cooling 9.5 g. phosphoryl trichloride diluted with 30 ml. chloroform is dropwise added upon stirring during 30 min. at 15–18°, whereupon the reaction mixture is heated to 50–60° for 2 hours, and then left to stand overnight at room temperature. Next day the substance that separates out is filtered off by suction. It then is washed with 50 ml. chloroform and moved into a one liter separating funnel, 250 ml. benzene are added whereupon the mixture is shaken with 50 ml. of a 10% NaOH solution. The benzene solution is then separated, dried with anhydrous potassium carbonate, filtered, and distilled off in vacuo. The residue is crystallized from 400 ml. ethanol with addition of activated charcoal. The yield is 28.2 g. (80.5%) of 2,4,6 - triiodo-3-dimethylaminomethyleneaminobenzyl chloride, which forms colourless needles with a M.P. 132–134° (decomp.).

Example 2

11.1 g. (0.02 mole) of 2,4,6-triiodo-3-dimethylaminomethyleneaminobenzyl alcohol, 48 ml. thionyl chloride, and 5 ml. dimethyl formamide are heated upon stirring for 3 hours at 50°. After cooling the solid portion is sucked off, washed with chloroform, and by means of 100 ml. of 10%-NaOH solution converted to a base, which is extracted into benzene (2×250 ml. each). The benzene is distilled off, and the residue recrystallized from 160 ml. ethanol. The yield is 8.2 g. (71%) of 2,4,6-triiodo-3 - dimethylaminomethyleneaminobenzyl chloride, M.P. 132–134° (decomp.).

Example 3

11.1 g. (0.02 mole) of 2,4,6-triiodo-3-dimethylaminomethyleneaminobenzyl alcohol are suspended in 110 ml. chloroform, and under moderate external cooling with water and upon stirring, 54 g. phosphorus tribromide diluted with 20 ml. chloroform are dropwise added during 15 min. Thereupon the reaction mixture is heated upon stirring for 2 hours up to boiling under reflux. The thick reaction mixture is cooled, 100 ml. water are dropwise added thereto, whereupon the mixture is alkalized in a separating funnel with 300 ml. of 10%-NaOH solution. It then is extracted by shaking it twice with 200 ml. benzene each, chloroform and benzene are distilled off, and the residue 9.5 g. is recrystallized from 280 ml.

ethanol. The yield is 8.5 g. (68.5%) of 2,4,6-triiodo-3-dimethylaminomethyleneaminobenzyl bromide, forming needle-like crystals with a M.P. 136–137°.

Example 4

20.1 g. (0.035 mole) of 2,4,6-triiodo-3-dimethylaminomethyleneaminobenzyl chloride, 7.35 g. diethanolamine, 6.5 g. sodium bicarbonate and 140 ml. absolute ethanol are heated upon stirring to boiling under reflux for 7 hours. The solid portion is sucked off while hot, and the mother liquor left to crystallize. After sucking off the crystals the solid portion is boiled with the mother liquor. The undissolved inorganic salts are separated out by filtering with suction, and the mother liquor left to crystallize. The two portions of the crystallized product are united (18.4 g.) and recrystallized from 300 ml. ethanol. The yield is 16.75 g. (74.4%) of N-(2,4,6-triiodo-E-dimethylaminomethyleneaminobenzyl) - diethanolamino, M.P. 157–158°.

Example 5

28.8 g. (0.05 mole) of 2,4,6-triiodo-3-dimethylaminomethyleneaminobenzyl chloride, 12.1 g. trimethylolmethylamine, 9.3 g. sodium bicarbonate, and 200 ml. absolute ethanol are heated while stirring to the boil under reflux for 7 hours. The mixture while hot is filtered by suction, and the mother liquor left crystallizes. After the crystals have been separated out by suction, the mother liquor is used for boiling out the undissolved portion, thus obtaining a further portion of the substance. After the two portions have been united, the product is recrystallized from ethanol. The yield is 22.3 g. (69%) of N - (2,4,6 - triiodo - 3-dimethylaminomethyleneaminobenzyl)-trimethylolmethylamine, M.P. 161°.

Example 6

28.8 g. (0.05 mole) of 2,4,6-triiodo-3-dimethylaminomethyleneaminobenzyl chloride, 19.5 g. N-methylglucamine, 9.3 g. sodium bicarbonate, and 200 ml. absolute ethanol, are heated with stirring to the boil under reflux for 7 hours. Then the inorganic salts are removed by filtering with suction, the mother liquor is concentrated to half volume, 300 ml. water added, and left to stand in an ice-box. The eliminated colourless, heavily viscous oil is converted in water to hydrochloride, the solution is filtered, and the oily base is precipitated with ammonia, which during drying in vacuum solidifies to form a solid glassy mass which has no definite melting point, and vigorously decomposes at 150°. The yield is 28 g. (76%) of N - (2,4,6 - triiodo - 3-dimethylaminomethyleneaminobenzyl)-N-methylglucamine.

(In the examples the temperatures are stated in centigrade.)

We claim:
1. An X-ray contrast agent of the general formula

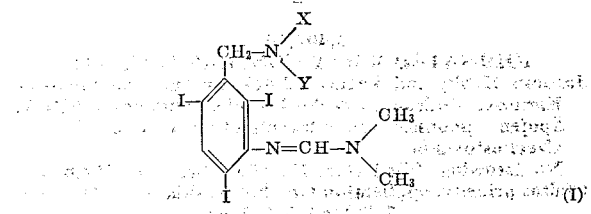

wherein X and Y are the same or different and are members selected from the group consisting of (a) hydrogen, (b) straight or branched alkyl, the said alkyl having up to 7 carbon atoms and including from 0 up to 6 hydroxyl groups, (c) an alkyl ring portion adapted to form a ring with the nitrogen attached to the methylene of the benzyl group, the said ring containing up to 6 carbon atoms and (d) alkoxy adapted to form an oxygen containing ring with the nitrogen attached to the methylene of the benzyl group, the said ring containing up to 6 members.

2. N - (2,4,6 - triiodo - 3 - dimethylaminomethyleneaminobenzyl)-diethanolamine, having a M.P. of 157–158° C.

3. N - (2,4,6 - triiodo - 3 - dimethylaminomethyleneaminobenzyl)-trimethylolmethylamine, having a M.P. of 161° C.

4. N - (2,4,6 - triiodo - 3 - dimethylaminomethyleneaminobenzyl)-N-methylglucamine, having a decomposition temperature of 150° C.

5. N - (2,4,5 - triiodo - 3 - dimethylaminomethyleneaminobenzyl)-morpholine, M.P. 146° C.

6. N - (2,4,6 - triiodo - 3 - dimethylaminomethyleneaminobenzyl)-cyclohexylamine, M.P. 76° C.

7. N - (2',4',6' - triiodo - 3' - dimethylaminomethyleneaminobenzyl)-1,1-dimethylolethylamine.

References Cited

UNITED STATES PATENTS 2,552,242   5/1951   Weissberger et al. ____ 260—562
3,227,760   1/1966   Richter et al. _____ 260—570.9
3,239,528   3/1966   Bebenburg et al. _____ 260—562

OTHER REFERENCES

Keck: "Annalen der Chemie," vol. 662, 1963, pp. 171–177.

LEWIS GOTTS, *Primary Examiner.*

J. R. BROWN, *Assistant Examiner.*